April 28, 1936.  P. R. BASSETT ET AL  2,038,531
ATTITUDE INDICATOR FOR AIRCRAFT
Original Filed May 23, 1929
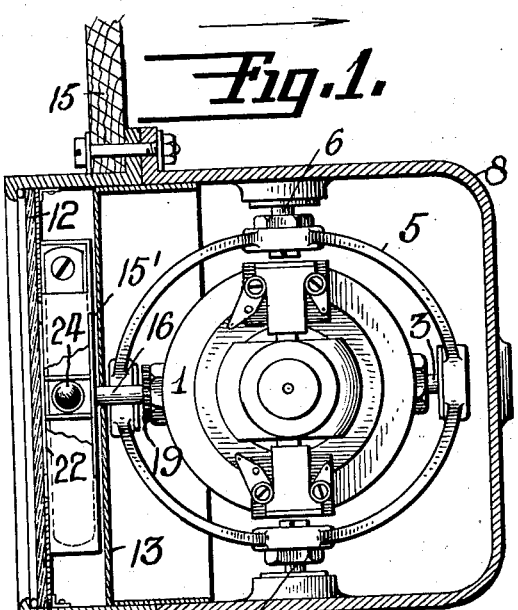
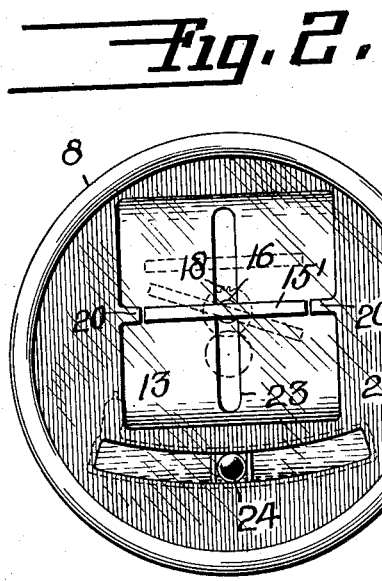
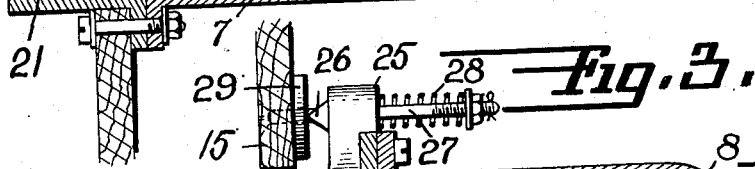
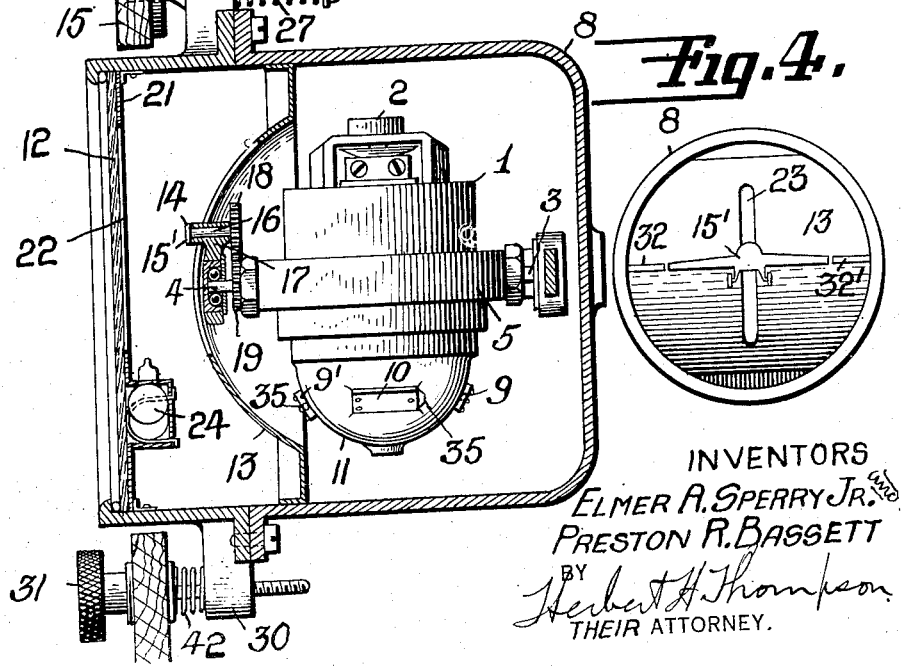
INVENTORS
ELMER A. SPERRY JR.
PRESTON R. BASSETT
BY Herbert H. Thompson
THEIR ATTORNEY.

Patented Apr. 28, 1936

2,038,531

UNITED STATES PATENT OFFICE 2,038,531

ATTITUDE INDICATOR FOR AIRCRAFT

Preston R. Bassett, Rockville Centre, and Elmer A. Sperry, Jr., Brooklyn, N. Y., assignors to Sperry Gyroscope Company, Inc., Brooklyn, N. Y., a corporation of New York Original application May 23, 1929, Serial No. 365,460, renewed August 25, 1934, now Patent No. 1,982,851, December 4, 1934. Divided and this application November 15, 1934, Serial No. 753,176. In Japan May 5, 1930

5 Claims. (Cl. 33—204)

This invention relates to navigational instruments for aircraft, and especially to an instrument designed to aid the aviator when flying "blind" in a fog or cloud, or at night when no land marks are visible. Perhaps the most essential and difficult feature when flying "blind" is to keep the airplane in the proper attitude of flight, since in a fog the aviator may lose all sense of true vertical and his plane get into a dangerous position leading to side slips, tail spins, nose dives, etc., before he has become aware of his position. One of the principal objects of this invention, therefore, is to give the aviator a simple, reliable indicator which he may use as an artificial horizon when flying "blind" and which can be thus interpreted by the aviator even when he becomes fatigued through long observation of his instruments. We are aware that many such devices have been proposed, but in all of them the indicators were of such a nature that they had to be "interpreted" by the pilot. While such instruments may indicate satisfactorily the vertical, they have not come into general use for the reason that airplane pilots have found that it is difficult to interpret such instruments. The purpose of the present invention, however, is to eliminate the necessity of the pilot converting in his own mind an instrument indication into terms of his normal reaction when flying with full visibility by making the instrument simulate the normal appearance of level daylight flying to the pilot.

This application is primarily composed of matter divided from our parent application, now Patent 1,982,851, dated December 4, 1934. According to the invention specifically claimed in said prior application, the movable member of the instrument represented the horizon and simulated the apparent movements of the real horizon both for pitching and banking. In the present application we claim specifically a flight indicator in which the movable member represents the airplane and hence simulates the movements of the airplane as observed from the forward portion of the airplane as observed from the pilot's seat. In other words, when the plane dives (for instance) the indicator moves down, or when the left wing tilts downwardly the indicator tilts in the same direction. The device thus still simulates the movements of the craft, but does it in an opposite manner from that specifically claimed in our aforesaid parent application.

The present invention has certain advantages in that an aviator's first tendency is to move the controls so as to bring the plane back in the direction of its apparent deviation, and this is the manner in which the present invention is employed as an indicator.

Referring to the drawing,

Fig. 1 is a plan view of our gyroscopic indicator, the casing being shown in section.

Fig. 2 is a face view of the same.

Fig. 3 is a side elevation, partly in section, of the same.

Fig. 4 shows a face view of a slightly modified form of instrument.

As the base line for actuating the indicating element, we prefer to employ a gyro vertical of the air erected type. This is shown in the drawing as comprising a gyro casing 1 enclosing a gyro rotor (not shown) for spinning about a normally vertical axis 2. The rotor may be driven by any suitable means, the electrically spun type being illustrated. The casing is mounted in neutral equilibrium for oscillation about a horizontal axis 3—4 within a gimbal ring 5. According to this invention, the minor axis 3—4 is preferably placed fore and aft on the aircraft and the major horizontal axis 6—7, on which the gimbal ring is pivoted within the casing 8, is placed athwartship. The spinning axis of the gyroscope is maintained vertical by a suitable air erecting device such, for instance, as shown in the prior patent of Leslie F. Cater and Elmer A. Sperry, Jr. (one of joint applicants), No. 1,934,774, dated November 4, 1933, for Gyro verticals, the air emerging through three or four spaced slotted openings in the dome shaped lower portion 11 of the gyro casing, which are normally partially covered by a pendulum and directed laterally through end orifices 35 in covering plates 9, 9' and 10.

The outer casing 8 is provided with a window 12, through which the indicator may be seen. A shield 21 is placed behind the window, having an opening 22 therein through which the indicator is visible. A fixed mask 13 across the casing behind the indicator conceals the gyroscope. The instrument is mounted on the instrument panel 15, as shown in Fig. 1 or Fig. 3, with the window 12 facing the rear, the aviator sitting to the rear thereof and looking towards the front of the plane, as indicated by the arrow in Fig. 1. The movable indicating member 14 is in this instance mounted on gimbal ring 5 so as to be stabilized against pitching by the gyroscope. In other words, it apparently moves up and down as the airplane pitches upwardly or downwardly, since it is stabilized by the gyroscope which is being viewed from the rear.

Since the indicator apparently moves in the same direction that the plane pitches, we also provide means to cause the indicator to roll or bank in the same direction that the plane rolls or banks. For this purpose the indicator bar 15' is shown as mounted on a short shaft 16 journalled in a bracket 17 secured to the gimbal ring 5. Said shaft carries at its inner end a gear 18 meshing with a similar gear 19 on the trunnion 4 of the gyro casing. Hence, when the gyroscope apparently tilts about the axis 3—4, the indicator 14 will be given an equal and opposite tilt so that the ends of the bar will actually tilt up or down in the same direction that the airplane tilts on banking. The upper dotted line position of the bar 15' in Fig. 2 illustrates the appearance of the indicator during a steep climb, while the inclined dotted line position illustrates the appearance of the indicator during a clockwise bank. Indicator bar 15' therefore really represents the airplane and is read in connection with fixed indices 20 and 20' on the shield 21. The mask 13 is shown as provided with a vertical slot 23 through which the sleeve or bearing 17 projects. If desired, a ball bank indicator 24 may be placed within the instrument so as to be visible on the face thereof.

In Fig. 3 the casing 8 is shown as having an adjustable mounting on the instrument. On top, the casing is provided with a lug 25 from which extends a pair of spaced knife edges or points 26. Between said knife edges a bolt 27 extends through the lug and is secured to the panel 15. A compression spring 28 between a nut on said bolt and said lug presses said knife edges tightly against a hard steel plate 29 on the panel, which acts as a pivot for the instrument. At its bottom, the plate is provided with a further lug 30 which is adjustable toward or away from the panel by thumb screw 31 threaded therein. It will be readily apparent that by turning the thumb screw, the inclination of the casing 8 with respect to the plate may be readily varied so that the normal position of the bar 15' may always be adjusted in line with the fixed indices 20, 20' for different loadings of the airplane. The compression springs 28 and 42 also cushion the shocks which would otherwise reach the instrument from the panel.

Since the apparent movements of indicator 15' really represent the actual movements of the aircraft, we prefer to make the same in the form of a miniature airplane, as shown in Fig. 4. In this case, also, the lower portion of the mask 13 is shaded to represent the ground while the upper portion represents the sky, the horizon being represented by the division lines 32, 32' corresponding to the fixed indices 20, 20' of Fig. 2, which of course also represent the horizon or normal level flying conditions.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A level flight indicator adapted to be mounted on the instrument board of an aircraft facing the pilot, including a fixed index representing the horizon or datum, a cooperating indicator representing the aircraft, mounted for up and down and tilting movements with respect to said fixed indicator, a gyroscope freely mounted about horizontal axes, and means connecting said gyroscope and movable indicator, said means including connections for causing by relative pitching of the aircraft and gyroscope apparent up and down movement of said movable indicator in the same direction as the aircraft pitches, and for causing by relative bank of the aircraft and gyroscope apparent tilting of said indicator in the same direction as the aircraft banks.

2. In a level flight indicator for airplanes, a gyroscope, a gimbal ring mounting therefor having its major axis trunnions athwartships of the airplane and minor axis trunnions fore and aft, an indicator representing the aircraft pivoted on the rear of said gimbal facing the aviator, and gearing connecting said indicator and gyroscope about said minor axis to tilt the indicator relatively to the aircraft in the same direction as the craft banks relatively to the gyroscope or horizon.

3. An attitude indicator for aircraft adapted to be mounted on the instrument board thereof, comprising a face on the rear of the instrument as mounted on the craft, a normally horizontal member extending substantially across said face and mounted to be elevated vertically and/or tilted horizontally relatively to said face, a gyrovertical in front of said face, having a gimbal pivoted athwartships and mounting said gyro, said member being pivotally mounted on said gimbal about a fore and aft axis and reversing gearing connecting said member and gyro about said fore and aft axis, whereby the movement of said member relatively to said face truly simulates both the pitching and banking of the aircraft.

4. A level flight indicator for aircraft comprising an indicator representing a normally horizontal portion of the aircraft, a cooperating indicator representing the horizon or datum, means for mounting one of said indicators for relative up and down movements, a gyroscope freely mounted about horizontal axes, means connecting said gyroscope and movable indicator whereby relative pitching of the aircraft and gyroscope causes up and down movement of said indicator, and means for adjusting the relative normal positions of said indicators to compensate for different normal conditions of flight, comprising a pivotal two point support for the upper portion of the device for securing it to the instrument panel and a third point of support at the bottom of the device, including means for adjusting the device toward and away from the panel.

5. A means for mounting aircraft attitude indicating instruments in back of the instrument panel comprising spaced knife edge bearings providing a two point support for the upper part of the instrument, a single third point of support at the bottom thereof clamping the same to the panel, and adjustable means for adjusting the bottom of said instrument at said point toward and away from the panel to compensate for different loading conditions of the aircraft.

PRESTON R. BASSETT.
ELMER A. SPERRY, Jr.